M. E. COURTNEY.
SPRING TIRE FOR VEHICLE WHEELS.
APPLICATION FILED MAY 31, 1911.
1,031,530.
Patented July 2, 1912.
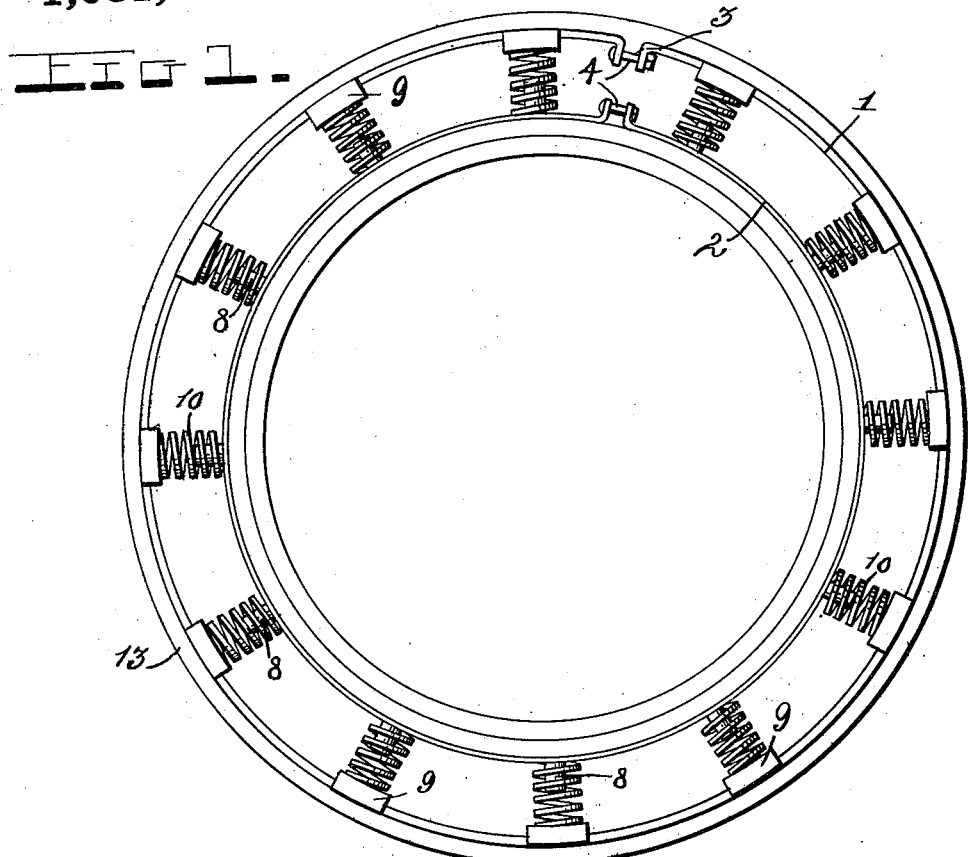
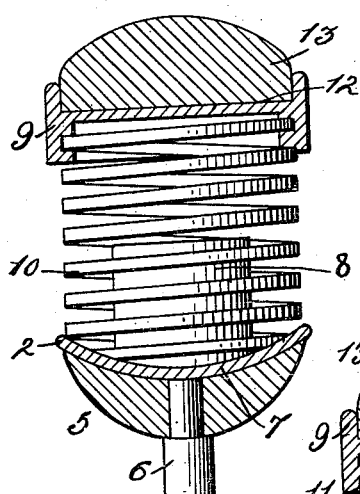
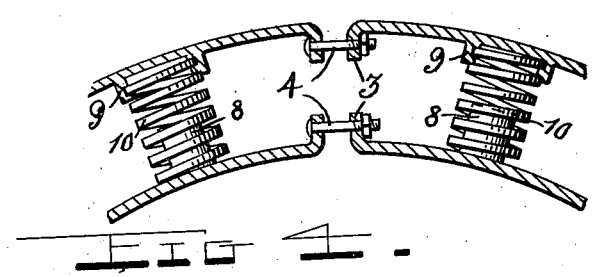
Inventor
Moyland E. Courtney
By Victor J. Evans
Attorney
Witnesses

UNITED STATES PATENT OFFICE.

MOYLAND E. COURTNEY, OF FAIR PLAY, MISSOURI.

SPRING-TIRE FOR VEHICLE-WHEELS.

1,031,530.  Specification of Letters Patent.  Patented July 2, 1912.

Application filed May 31, 1911. Serial No. 630,286.

*To all whom it may concern:*

Be it known that I, MOYLAND E. COURTNEY, a citizen of the United States, residing at Fair Play, in the county of Polk and State of Missouri, have invented new and useful Improvements in Spring-Tires for Vehicle-Wheels, of which the following is a specification.

This invention relates to improvements in spring tires for vehicle wheels, and has for an object to provide a tire which will be extremely resilient or elastic, and which, in practice, will be found an efficient substitute for the well known pneumatic or rubber cushion tires.

Another object of the invention is to provide a tire which can be conveniently connected with or disconnected from the felly of the wheel.

In the drawing, forming a portion of this specification and in which like numerals of reference indicate similar parts in the several views:—Figure 1 is a side view of my improved tire. Fig. 2 is a transverse section therethrough showing its application to a vehicle wheel. Fig. 3 is a section through a portion of the ring member. Fig. 4 is a detailed sectional view clearly illustrating the threaded inner walls of the cylindrical sockets.

My improved tire comprises an outer split ring member 1 and a similar inner member 2, the terminals of each ring being provided with flanges 3 which are engaged by a fastening device 4. From this construction it will be seen that the members 1 and 2 can be quickly and very conveniently connected with or disconnected from the felly 5 of the wheel 6. The felly 5 is preferably provided with a transversely curved inner surface 7, and as illustrated, the inner ring member 2 of the tire is correspondingly curved transversely so as to present an inner convex surface to snugly fit in the concavity in the outer surface of the felly and thereby prevent lateral displacement of the inner ring member on the felly as will be understood.

The inner ring member is provided with a series of radial studs 8 which are disposed in line with inwardly extending radial sockets 9 on the outer ring member 1. Strong helical extensile springs 10 are disposed radially with respect to the felly 5, being interposed between the inner and outer ring members 1 and 2, and as shown, the springs are arranged in embracing relation upon the studs 8 and held thereby against accidental displacement. The convolutions or wound portions of the springs 10, in effect, form screw-threads. The sockets 9 are threaded interiorly, at 11, so as to threadedly receive the convolutions of the springs adjacent to the outer ends thereof. From this construction it will be readily seen that the ring members 1 and 2 can be quickly engaged with or disengaged from the felly 5 and when operatively mounted thereon, as shown in Fig. 2 of the drawing, and connected by the springs 10, form an efficient substitute for the pneumatic or solid cushion rubber tire. The outer ring member is preferably provided with an annular channel 12 in which is fitted a cushioning surface 13 which may be constructed of rubber, leather or the like.

I claim:

A tire comprising spaced inner and outer concentric split rings, springs interposed between the said concentric rings, the said inner split ring being provided with a series of integrally formed inwardly extending studs, the said outer split concentric ring being provided with a series of integrally formed inwardly extending, interiorly inclined, threaded sockets arranged in spaced relation on the inner face thereof and adapted to receive the outermost convolution of said spring, the opposite terminal portions of the said outer split ring being provided with inwardly extending flanges and means adjustably connecting the flanges, whereby the said outer ring may be adjusted circumferentially to cause a proper seating of the tire and also to adjust the said threaded sockets into alinement with the said rigid studs.

In testimony whereof I affix my signature in presence of two witnesses.

MOYLAND E. COURTNEY.

Witnesses:
 COOPER JONES,
 J. W. PERKINS.

Copies of this patent may be obtained for five cents each, by addressing the "Commissioner of Patents, Washington, D. C."